United States Patent [19]
Neufeld

[11] 3,736,707
[45] June 5, 1973

[54] AIRCRAFT HANGAR CONSTRUCTION

[76] Inventor: Leo G. Neufeld, Box 35, Rantoul, Kans. 66079

[22] Filed: Dec. 18, 1970

[21] Appl. No.: 99,459

[52] U.S. Cl............................................52/65, 52/81
[51] Int. Cl. ..............................................E04b 1/346
[58] Field of Search........................52/65, 66, 67, 82, 52/81; 214/16.1 A; 135/3 E

[56] References Cited

UNITED STATES PATENTS

| | | | |
|---|---|---|---|
| 3,562,976 | 2/1971 | Wollin | 52/81 |
| 1,841,321 | 1/1932 | Arnstein | 52/65 |
| 1,861,069 | 5/1932 | Smith | 52/65 |
| 3,168,101 | 2/1965 | Porter | 135/3 E |

FOREIGN PATENTS OR APPLICATIONS

| | | | |
|---|---|---|---|
| 294,456 | 3/1916 | Germany | 52/65 |
| 774,802 | 1/1968 | Canada | 52/81 |
| 238,169 | 5/1910 | Germany | 52/65 |
| 1,830 | 2/1913 | Great Britain | 52/65 |
| 1,123,791 | 8/1968 | Great Britain | 52/67 |

OTHER PUBLICATIONS

Retractable Dome for All-Weather Arena; Architectural Record May 1959; pages 250-252

*Primary Examiner*—John E. Murtagh
*Assistant Examiner*—Henry E. Raduazo
*Attorney*—Scofield, Kokjer, Scofield & Lowe

[57] ABSTRACT

A circular aircraft hangar construction has two semicircular (when viewed from above) halves mounted on wheels and movable relative to each other. The halves move in concentric circles with the wheels appropriately spaced so as to not interfere with the movement. The halves are interconnected at their upper portion by a central hub which permits the relative movement thereof. Arcuately shaped light weight supports extend from the central hub structure over the top of the halves and finally anchor in the ground a space distance away from the vertical sides of the hangar. Each half is constructed from a plurality of sections which are easily connected and which have reinforcing rib surfaces on the upper portion thereof.

In operation, the hangar construction is completely opened by simply moving one of the halves relative to the other. An airplane may be located therein and the same side returned to its original position thereby forming the circular structure and completely enclosing the aircraft.

2 Claims, 6 Drawing Figures

INVENTOR.
Leo G. Neufeld
BY
ATTORNEYS

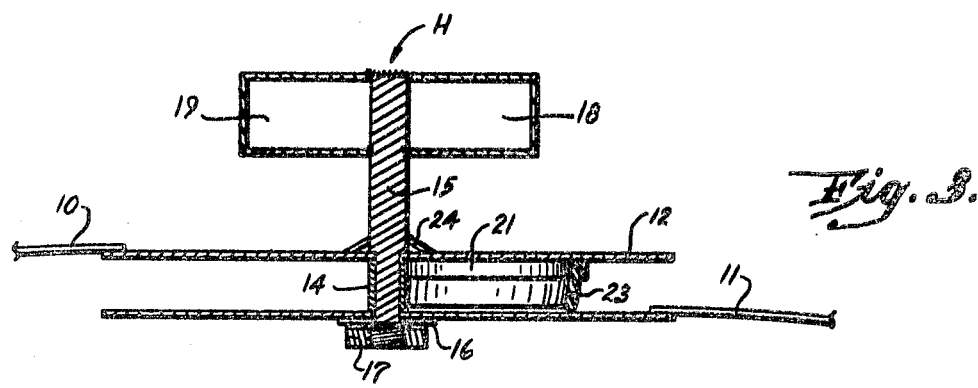
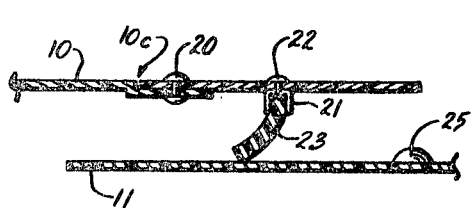
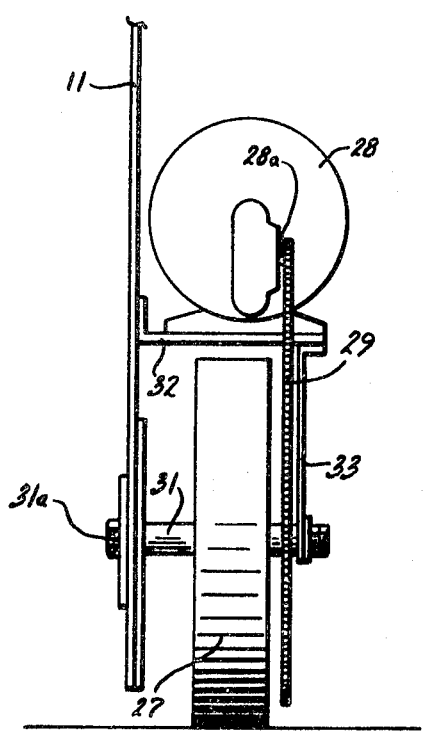
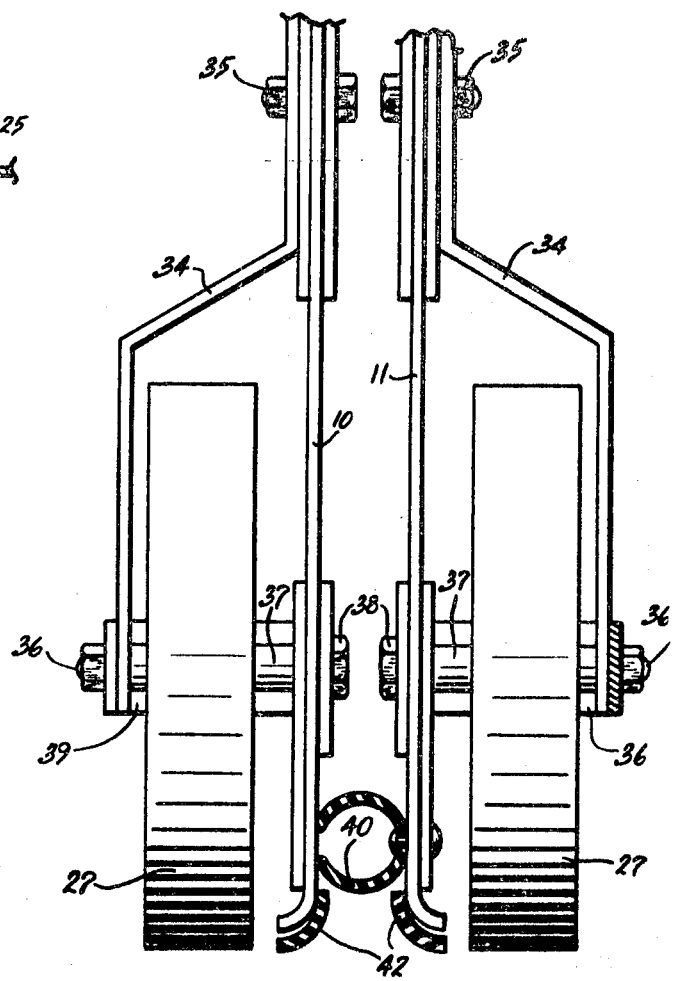

AIRCRAFT HANGAR CONSTRUCTION

BACKGROUND AND BRIEF DESCRIPTION OF THE INVENTION

General aviation pilots are constantly faced with the problem of aircraft storage on away flights to smaller airports with limited facilities. Further, with existing hangar facilities, a general aviation pilot is faced with the problem of moving his aircraft into and out of a hangar construction generally by hand or with some towing prime mover. My invention relates to a unique hangar construction that is light weight, portable and which easily facilitates the locating of an airplane either in or out of the hangar construction.

The subject invention is comprised of two semicircular (when viewed from above) halves which are mounted on motor driven wheels and which are movable relative to each other. These halves (or alternatively only one half) are designed to move in concentric circles. One half has relative movement substantially completely inside the other (the latter half being slightly larger and spaced from the smaller half). The two halves are interconnected by a center hub which is located above the midpoint of the circular structure. Light weight arcuately shaped supports extend from the center hub generally outwardly and downwardly to anchor the hangar construction against gusting winds and to add support to the upper surface of the construction against increased heavy dynamic loads.

Each half will be comprised of a plurality of sections with each section having an edge or seam portion that is suitably shaped to mate with a corresponding edge portion of an adjacent section. Pop rivets, zuce screws and other quick fasteners will be utilized with the overlapping edge portions of the seam so that quick assembly is obtainable. Further, each section will have reinforcing ribs running from near the upper annular opening close to the center hub and down over the rounded outer surface to approximately one third of the distance down the vertical side. At least one of the sections will have a doorway located therein to permit entrance and egress from the hangar construction without the necessity of moving one of the halves. Finally, the two halves (and the associated sections) may be constructed of a glass fiber or similar material, having a relatively thin wall so that it is light weight but yet be sturdy, rugged, durable and capable of supporting substantial dynamic loads. Also, it should be pointed out that the arcuately shaped tubular supports are so oriented with respect to the unit that when one of the concentric halves is moved with respect to the other, the hangar construction has approximately 180° of opening for easy positioning of the aircraft either in or out of the hangar. Accordingly, the necessity of pushing, shoving, towing or otherwise moving the heavy aircraft has been kept to a minimum by the subject construction.

Due to the ease of handling, assembling, low cost, and relatively low weight requirement, the building structure could be used with other purposes in mind. For example, instead of being utilized as an aircraft hangar, the structure could be used to store grain, farm equipment, boats, oil well machinery and other related articles.

A primary object of my invention is to provide a sturdy, rugged, easily movable and economical hangar structure for housing and otherwise sheltering aircraft.

Another object of my invention is to provide a uniquely constructed aircraft hangar construction which facilitates the housing of general aviation aircraft while at the same time decreases the manual effort normally associated with placing the aircraft in the hangar or removing same therefrom.

A further object of my invention is to provide a uniquely constructed aircraft hangar structure which is comprised of a plurality of easily assembled (and disassembled) sections. It is an important feature of my invention that a relatively small light weight vehicle such as a pickup truck is able to transport all of the components of the building structure and that same is easily assembled at the site of either temporary or permanent landing strip facilities without complex and expensive preparation.

A further object of my invention is to provide a uniquely constructed aircraft hangar which includes two relatively movable halves so that an entire half of the structure may be opened for either aircraft storage or removal therefrom. It is an important feature of the invention that the halves include arcuately shaped supports that are positioned relative to the halves for anchoring same against wind gusts and the like while simultaneously providing support for dynamic loads but yet in no way interferes with the complete opening of at least one half of the structure.

Another primary object of my invention is to promote aircraft safety by bringing economical and simple storage within the price and convenience range of general aviation aircraft users on temporary or limited facility landing strips and/or airports. The important feature of this object is that the ease with which the aircraft is housed out of the adverse weather conditions promotes proper aircraft maintenance and prevents deterioration from weather exposure.

Another object of my invention is to provide a uniquely constructed aircraft hangar which is comprised of two semicircular halves (when viewed from above) and which includes a means for automatically moving one half with respect to the other so that an entire half of the hangar construction is open for aircraft storage or removal.

A further object of my invention is to provide a uniquely constructed aircraft hangar of the character described which is virtually maintenance free and which may be easily assembled and disassembled without the need for heavy construction equipment or substantial excavation and foundation constructions.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith and in which like reference numerals are employed to indicate like parts in the various views:

FIG. 3 is an enlarged sectional view taken generally along the line 3—3 of FIG. 1 in the direction of the arrows and showing the central hub;

FIG. 4 is an enlarged sectional view taken generally along the line 4—4 of FIG. 1 in the direction of the arrows and showing the interconnection of the individual panels;

FIG. 5 is a partial enlarged view taken generally along the line 5—5 of FIG. 1 in the direction of the arrows and having the supporting wheels connected with the individual concentrically movable halves; and FIG. 6 is an elevational view of the motor and associated drive mechanism used to initiate the movement of one side with respect to the other.

Figure 1:
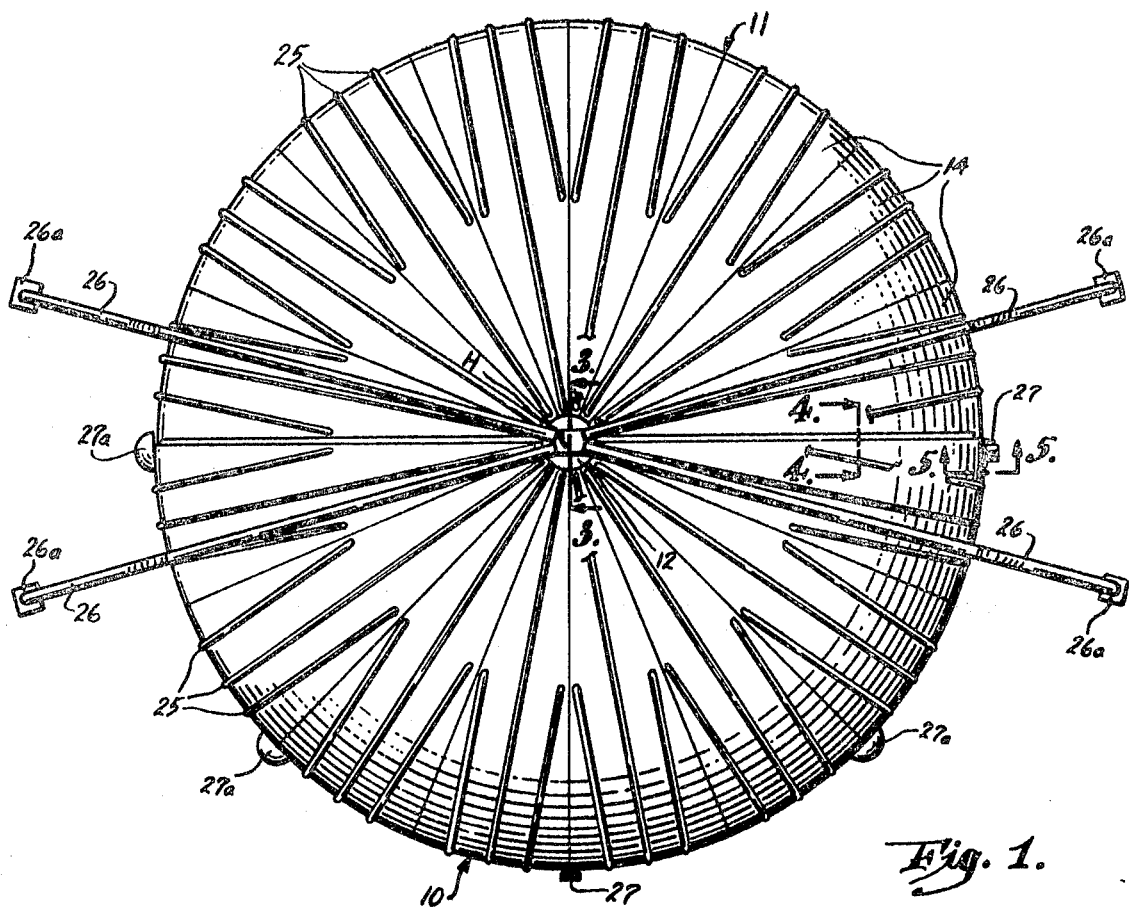
FIG. 1 is a top plan view of the aircraft hangar construction.
Figure 2:
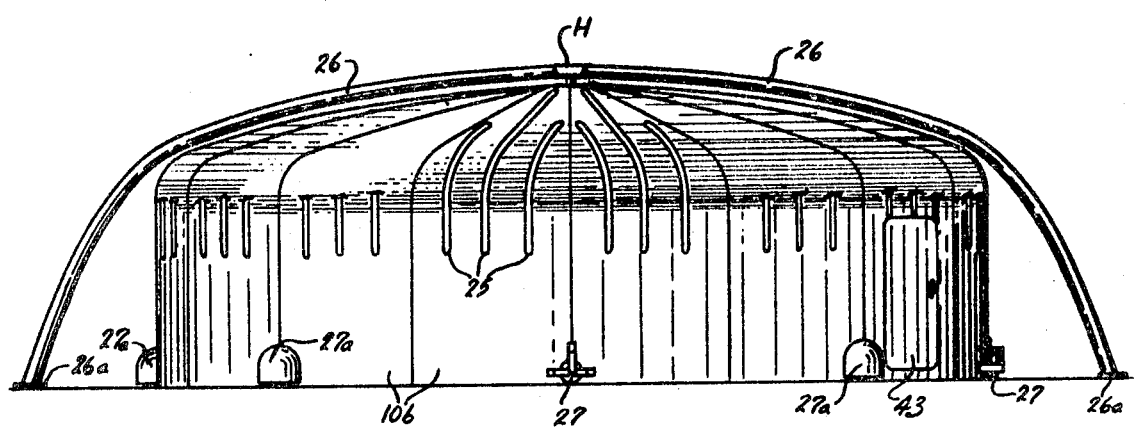
FIG. 2 is a front elevational view of the hangar construction shown in FIG. 1.

Turning now more particularly to the drawings, reference numeral 10 is used to indicate the forward half of the hangar construction while reference numeral 11 indicates the rearward half of same as shown in FIG. 1. Further, as shown therein, the forward half has a slightly larger diameter and indicated by the diameter line 10a which essentially bisects the circular (when seen from above) hangar construction. Further, the forward half 10 and the rearward half 11 are comprised of a plurality of glass fiber panel sections identified by the numerals 10b and 11b, respectively. These panels, as will be described in more detail later, are easily connected and have appropriately shaped edge or seam portions to facilitate the mating of the sections.

The upper portion of the hangar construction includes a central hub generally designated by the letter H. The hut H is comprised essentially of a pair of spaced apart pivot plates (see FIG. 3) with the upper plate being identified by the numeral 12 and the lower plate identified by the numeral 13. An annular spacer 14 further separates the two plates. Pivot pin 15 extends through the annular spacer 14 and has an externally threaded lower end which accommodates the positioning of a washer 16 and a caselated nut 17 thereon for the fixed location of the entire hub. The upper portion of hub H contains two rectangular openings 18 and 19 formed on either side of pin 15 and weldedly connected thereto in order to provide telescoping mounting surfaces for the arcuately shaped supports as will be described. The openings 18 and 19 could take on an alternate noncircular configuration (in section) and the rectangular showing of openings 18 and 19 is considered to be illustrative only. Seal 24 is located around pin 15 for additional weather protection measures.

As suggested above, each of the two halves is constructed from a plurality of easily assembled (or disassembled) sections. FIG. 1 indicates that the upper portions of these sections are wedged shaped. However, as seen in FIG. 4, each section will have an edge or seam 10c portion which mates with the flat surface of the adjacent section. A pop rivet 20 or zuce screw (or other quick release fasteners) extend through the flat surface of the adjacent panel section and through the contoured mating seam leaving only the head of the pop rivet appearing above the normal surface of an overlapping seam. It is further contemplated that an inverted U-shaped metal retainer 21 will be connected close to the diameter line 10a of the larger half 10 by pop rivet 22 (and around the undersurface of the upper plate). This retainer H contains a neoprene rubber sealer strip 23 which extends along the peripheral edge of the vertical sides and runs the length of the diameter line 10a, and which flexibly contacts the corresponding surfaces of the slightly smaller half 11. Accordingly, sealer strip 23 and a seal 24 which is located around the pivot pin 15 of central hub H makes the upper portion of the hangar construction substantially weather tight.

As shown in various views, each panel section will have three raised ribs 25 located thereon and spaced an equal distance apart. (Alternatively, the panel sections could be corrugated with the seam portions pressed flat.) It is contemplated that a central rib will run near the upper plate of central hub H and over the curved edge approximately one third down the vertical side of this particular section. Two shorter ribs will be located on either side thereof and extend upwardly on the roof section of the hangar approximately half of the distance to the central hub and likewise go over the rounded edge approximately one third down the corresponding vertical side. FIG. 4 shows a relation of the ribs to the rubber seal. In this regard, it should be pointed out that the flexibility of seal 23 is sufficient to allow same to ride over the rib during the rotation of either one of the halves.

Each (there being four in number) of the contoured arcuately shaped supports are generally indicated by the numeral 26. These supports may be manufactured from tubular aluminum or from tubular glass fiber and will have an end pad 26a located thereon. A spade-like end (not shown) depends from each pad to facilitate the insertion of same into the ground for supporting bracing purposes. As suggested above, the upper end of each of the arcuate supports are designed to be located in the rectangular openings 18 and 19. In this regard, it is contemplated that the upper end portion of the supports will be similarly shaped and sized so that same may be easily inserted into the noncircular opening for connection purposes. Also, the supports and the general shape of the upper connecting structure which comprises the openings 18 and 19 is such that an entire half (either 10 or 11) of the structure may be rotated about its associated center plate leaving a full 180° of entry or egress space in the area of the vacated half.

Further, these supports with their spade-like lower end portions being buried in the ground brace the glass fiber structure against wind gusts and offer additional support to the roof portion of the hanger construction against heavy dynamic loads such as may occur due to ice and snow storms.

Turning now more particularly to the supporting wheels and motor unit, it has been suggested that each of the movable halves be supported on power driven wheels. (It is possible that these halves may be manually moved, however the preferred embodiment includes the power driven wheels.) FIG. 1 shows the wheels 27 as being mounted on the exterior of the larger half 10. For protective purposes, the wheels 27 have been shown as including wheel coverings 27a which likewise may be formed from glass fiber and which offer protection for the wheels from adverse climatic conditions. At least one wheel on each hangar half will have a reversible gear motor 28 mounted above same. This motor may be an electric (1/20) horse power reversible gear motor having a conventional drive chain 29. (Alternately, a conventional gear reduction drive could be used.) In this regard, conventional sprockets will be located on the axle of the associated wheel and on the drive shaft 28a of motor 28. As shown in FIG. 6, wheel 27 will be mounted on the interior of the smaller half 11 by utilizing a bearing plate 30 through which the rotatable axle member 31 will extend. Wheel 27 then is fixedly connected to axle member 31 with same having its fixed sprocket located on the inner end portion thereof.

A suitable mounting bracket 32 provides support for electric motor 28 above wheel 27. This bracket may have a substantially vertical flange with suitable connecting bolts extending through the vertical portion and the side wall portion. A vertical support 33 will extend from the inner end portion of axle member 31. It is contemplated that axle member 31 will be in the nature of a bearing sleeve which rotates on a pin member or conventional bolt. This bolt (31a) will extend through openings in both plate 30 and support 33 with the sleeve being located therebetween. The axle sprocket is then fixedly connected to the sleeve to thereby impart rotary motion to wheel 27 from motor 28.

FIG. 5 shows how the two halves are supported on wheels relative to each other. In this figure, the sides include brackets 34 which extend from a bolted connection 35 down to a central pin or axle bolt 36. This central pin will have the bearing sleeve 37 mounted thereon which is likewise fixedly connected to the appropriate wheel 27. The bolt-pin combination will then be securely fastened to hold same in an operative position. Bracket spacer 38 maintains the bearing sleeve and central pin in proper location and provides a support for the bolt connection means. It is contemplated that an annular reverse C-shaped ring 40 will circumscribe the lower portion of the vertical wall of the smaller half 11 and will be fixed thereto by pop rivets 41. This ring will bear against the inner surface of the vertical wall of half 10 and provide a seal therebetween. Further, flexible strips of neoprene rubber or the like (identified by the numerals 42) will be fixed to the lower end portion of each of the halves and will come in ground contact to provide a seal and to prevent dampness and wind from entering between or under the halves.

As suggested above, the two halves may be completely disassembled for transportation and easily assembled at the appropriate situs. For example, the various sections are interconnected as suggested above with respect to FIG. 4. The central hub H and the support mounting section will be appropriately located by fixing the arcuate supports thereto and anchoring same in the soil. Then, the individual sections may be located and quick fastened in rapid order to complete each of the halves. Finally, at least one of the sections in the larger half will have an access door 43 located thereon to permit extrance and egress from the hangar structure without necessitating movement of one or more of the halves.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A movable building structure having a generally circular configuration, said structure comprising
   two semicircular building sections, said building sections having relative movement in concentric arcs, said sections having a first relative position forming an enclosed building structure and a second position forming an opening to said structure, said sections being comprised of a plurality of panels,
   means for releasably connecting said panels to form said sections,
   a support means for bracing said structure, and
   means for movably mounting at least one of said sections to accomplish the further second positions and said relative movement, said support means being generally arcuate in shape and extending substantially over the diameter of said structure, said support means being connected to a portion of said movable mounting means and contacting the ground level on said opposite sides of a diametric line to the center of said structure support means thereby supporting said mounting means and said building sections by having a substantially compressive load applied thereto.

2. The combination as in claim 1 wherein said movably mounting means includes supporting at least one of said sections on a plurality of wheels, and a motor means for selectively powering at least one of said wheels to accomplish said relative movement.

* * * * *